United States Patent [19]

Suzumura et al.

[11] Patent Number: 4,875,817

[45] Date of Patent: Oct. 24, 1989

[54] SEALED WELD NUT

[75] Inventors: Hiroyuki Suzumura; Yuji Okamoto, both of Toyota; Isao Suezaki, Aichi, all of Japan

[73] Assignee: Toyota Jidosha Kabushiki Kaisha, Japan

[21] Appl. No.: 70,822

[22] Filed: Jul. 7, 1987

[30] Foreign Application Priority Data

| Jul. 11, 1986 | [JP] | Japan | 61-163047 |
| Jul. 14, 1986 | [JP] | Japan | 61-165285 |
| Jul. 14, 1986 | [JP] | Japan | 61-165286 |
| Jul. 26, 1986 | [JP] | Japan | 61-176097 |

[51] Int. Cl.$^4$ .................... F16B 37/06; F16B 37/14
[52] U.S. Cl. .................... 411/171; 411/429; 411/431
[58] Field of Search ........ 411/171, 258, 432, 429–431, 411/371–373, 375, 377

[56] References Cited

U.S. PATENT DOCUMENTS

| D. 208,428 | 8/1967 | Holliday | 411/431 X |
| 1,427,616 | 8/1922 | Moore | 411/171 X |
| 2,761,483 | 9/1956 | Richardson | 411/171 |
| 3,578,200 | 5/1971 | Hetzer | 411/910 X |
| 4,322,195 | 5/1982 | Rebish et al. | 411/431 |

FOREIGN PATENT DOCUMENTS

| 248509 | 12/1963 | Australia | 411/171 |
| 45449 | 10/1982 | Japan. | |
| 6369 | 1/1987 | Japan. | |
| 6370 | 1/1987 | Japan. | |
| 6371 | 1/1987 | Japan. | |
| 6372 | 1/1987 | Japan. | |
| 6373 | 1/1987 | Japan. | |
| 6374 | 1/1987 | Japan. | |
| 6375 | 1/1987 | Japan. | |
| 778547 | 7/1957 | United Kingdom | 411/171 |

Primary Examiner—Gary L. Smith
Assistant Examiner—Douglas E. Ringel
Attorney, Agent, or Firm—Finnegan, Henderson, Farabow, Garrett & Dunner

[57] ABSTRACT

A sealed weld nut comprises a nut body having an axial through bore, a threaded portion provided on an inner periphery of the bore, weld portions to be welded provided on one axial end of the nut body, and a separate removable sealing member provided on the other axial end of the nut body for preventing a foreign matter from passing into the bore through the other axial end of the nut body.

2 Claims, 8 Drawing Sheets

SEALED WELD NUT

FIELD OF THE INVENTION AND RELATED ART STATEMENT

The present invention relates to a sealed weld nut to be welded to a base member, and which is to cooperate with a bolt in fixing another member to the base member. The present invention also relates to a method of producing such sealed weld nut.

It is well known to fix an accessory or like member to a stationary part such as the body of an automobile by means of a bolt screwed to a weld nut which is secured to such stationary part by resistance welding. Such weld nuts are often attached to an inner or reverse side of the panel of the body. The reverse side of the body, particularly the automobile body, is usually coated with an anti-rust agent such as vinyl-chloride sol. As a result, the threaded bore of the nut also is coated with the anti-rust agent, so that the task of screwing a bolt into the bore is made difficult. In addition, the anti-rust agent flows out through the threaded bore of the weld nut and contaminates the painted portions of outer side of the body panel.

In order to avoid such problems, various proposals have been made such as attaching of a masking member to the weld nut or the use of a cap-type weld nut.

Japanese Utility Model Laid-Open No. 45449/1982 discloses a proposal in which the threaded bore in the weld nut is closed by a sealing member.

The use of a masking member, however, is disadvantageous in that an additional step is required for attaching the masking member to the weld nut, undesirably impairing production efficiency. The use of cap-type weld nut not only raises the weight and cost but also impedes automatic feed of the weld nuts.

OBJECT AND SUMMARY OF THE INVENTION

Accordingly, an object of the present invention is to provide an improved sealed weld nut which is compact and light and which avoids any inconvenience of the prior art incurred as a result of painting contamination and of coating with anti-rust agent.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the sealed weld nut of this invention comprises a nut body having an axial through-bore along a center axis thereof, the nut body having first and second axial ends, and the through-bore having an inner wall surface, a threaded portion provided on at least a part of the inner wall surface; weld portions provided at the first axial end of the nut body, and a separate sealing member provided at the second axial end of the nut body for preventing foreign material from passing into the through-bore at the second axial end, the sealing member including a tubular portion which is closed at one end thereof, the tubular portion having an outside diameter substantially equal to the inside diameter of the through-bore, so that the tubular portion is slidably inserted into the through-bore and detachably retained within the through-bore.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIGS. 12A and 13B are perspective views showing a fourth embodiment of the invention;

DESCRIPTION OF THE PREFERRED EMBODIMENTS

Before turning to detailed description of the preferred embodiments, a description will be made hereinunder as to problems encountered by the prior art.

Figure 5:
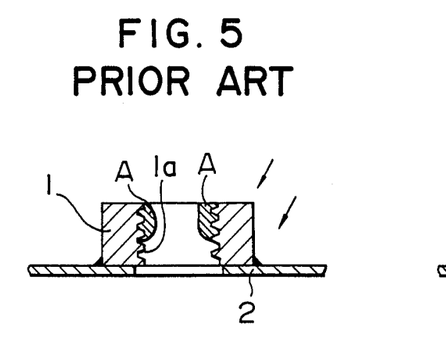
FIGS. 5 to 8 are sectional views showing prior art weld nuts, respectively.
Figure 6:
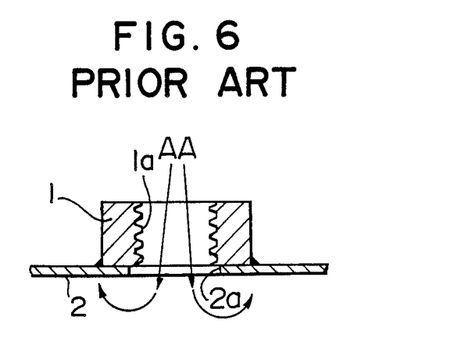

Hitherto, there has been a problem in that, as shown in FIG. 5 illustrating a prior art weld nut, the anti-rust agent A undesirably attaches to a threaded bore 1a of a weld nut 1, making it difficult to tighten the bolt. Another problem encountered by the conventional weld nut of the type described is that, as shown in FIG. 6, when the anti-rust agent A is applied to a reverse surface of an object 2 to which the weld bolt 1 is welded, the anti-rust agent undesirably spreads or flows out through the threaded bore 1a in the weld nut 1 and through an opening 2a of the object 2 so as to contaminate a painted surface of the object 2.

Figures 7A, 7B:
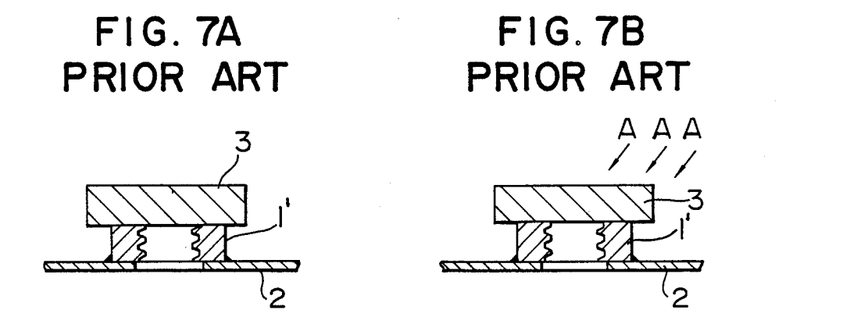
Figure 7C:
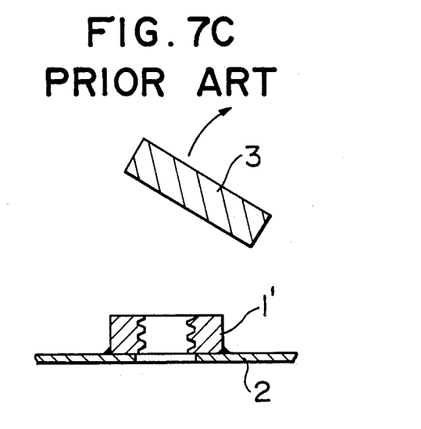
Figure 8:
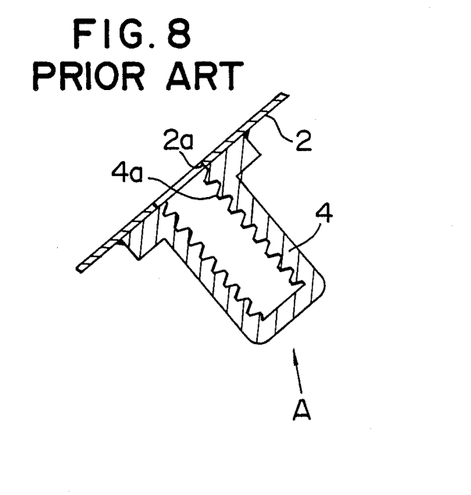

A conventional proposal for overcoming this problem is shown in FIGS. 7A to 7C. Namely, a masking member 3 is attached to an end of the weld nut 1' opposite to the weld surface of the object 2 as shown in FIG. 7A. After the anti-rust agent A is applied as shown in FIG. 7B, the masking member 3 is removed as shown in FIG. 7C. Alternatively, a cap-type weld nut 4 as shown in FIG. 8 has been used to avoid the above-described problems. On the other hand, Japanese Utility Model Laid-Open No. 45449/1982 proposes the use of a sealing member which closes the treaded bore of the weld nut.

These known arts, however, suffer from the following disadvantages. Namely, the weld nut of the type shown in FIGS. 7A to 7C requires additional steps for attaching to and removing of the masking member from the weld nut 1', thus imparing productivity. The cap-type weld nut 4 shown in FIG. 8 also encounters a problem in that the paint blown onto an outer surface of the object 2 opposite to the weld nut 4 is confined within the weld nut due to cap-type nature of the latter so as to cause the threaded bore 4a to be clogged with the paint. In addition, the cap-type weld nut 4 is required to have a considerable length when a length of the stem of the bolt to be screwed into such weld nut is large, with the result that the weight and the cost are increased besides the automatic feeding of the weld nuts 4 is seriously impaired. It is to be noted also that the art proposed in Japanese Utility Model Laid-Open No. 45449/1982 cannot satisfactorily prevent the problem of clogging of the threaded bore of the weld nut with the paint, because in this publication the weld nut is merely closed by a sealing member.

Preferred embodiments of the present invention will be described hereinunder.

Figure 1:
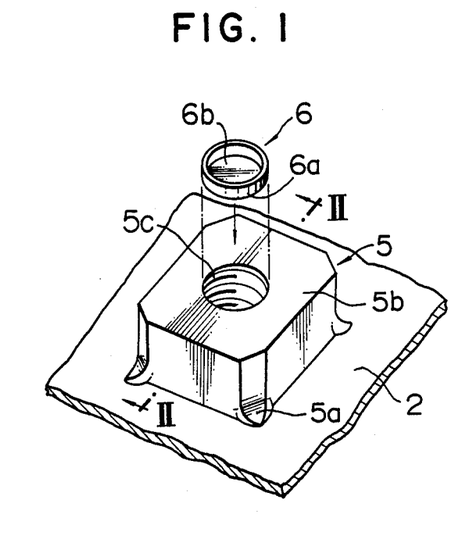
FIG. 1 is a perspective view showing a first embodiment of the present invention.
Figure 2:
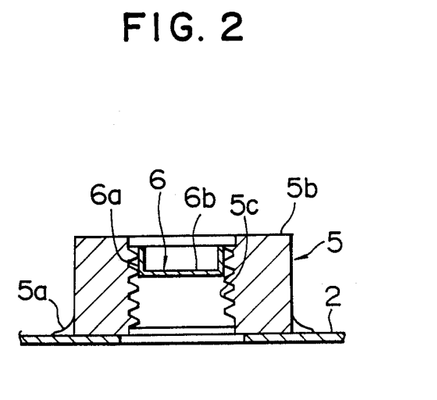
FIG. 2 is a sectional view taken along the line II—II in FIG. 1.

Referring first to FIGS. 1 and 2, a sealed weld nut 5 has a substantially square cross-section and is provided with weld portions 5a slightly projected outward from four corners of one end surface of the nut 5. The other end surface 5b of the weld nut 5 constitutes an electrode receiving surface which bears an electrode when the nut 5 is welded to an object such as the body of the automobile. The weld nut 5 is provided in a center thereof with an axial threaded through bore 5c. A sealing member 6 is made from a thin sheet in a cylindrical form having a bottom. The sealing member 6 is press-fit into the threaded bore 5c from the end surface 5b of the weld nut 5. The sealing member 6 is prevented from coming off the weld nut 5 during transportation by virtue of friction acting between an outer peripheral surface 6a of the sealing member 6 and the thread of the threaded bore 5c.

The operation and effect of this embodiment will be described hereinunder with reference to the drawings. The weld nut 5 with the sealing member 6 received therein is welded at its weld portions 5a to the object 2 such as the body of an automobile by resistance welding. When paint is applied to the surface of the object 2 opposite to the weld nut 5, air and the paint which has a lower viscosity than an anti-rust agent can escape through minute gaps formed between an inner peripheral surface of the threaded bore 5c of the weld nut 5 and the outer peripheral surface 6a of the sealing member 6, so that the paint is prevented from accumulating within the weld nut 5. On the other hand, when an anti-rust agent is applied to the surface of the object 2 from the same side as the weld nut 5, the anti-rust agent is prevented from being deposited on the thread in the threaded bore 5c of the weld nut, as well as the painted surface of the object 2, because the threaded bore 5c is closed by the sealing member 6.

When a member such as a bracket (not shown) is secured to the object 2 by means of a bolt, the bolt is screwed into the threaded bore 5c from one end surface of the nut 5 and the end of the bolt pushes against the bottom 6b of the sealing member 6, so that the sealing member 6 comes off the weld nut 5. Thus, the sealing member 6 does not impede the tightening of the bolt, and the bracket can be securely fixed to the object 2 by the bolt.

Figure 3:
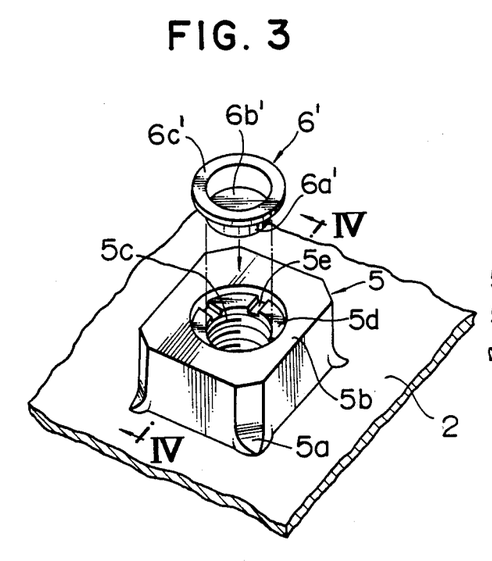
FIG. 3 is a perspective view showing a second embodiment of the present invention.
Figure 4:
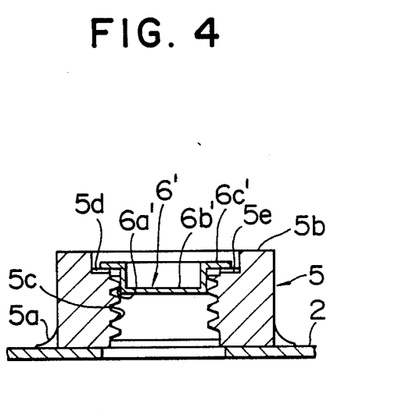
FIG. 4 is a sectional view taken along the line IV—IV in FIG. 3.

Another embodiment of the weld nut in accordance with the present invention will be described hereinunder with reference to FIGS. 3 and 4. In these Figures, the same reference numerals are used to denote the same parts or members as those appearing in FIGS. 1 and 2 illustrating the first embodiment.

In the second embodiment, the weld nut 5 is provided with a recessed seat 5d formed in the electro-receiving surface 5b thereof around the threaded bore 5c. The sealing member 6' is provided at the open end thereof with a peripheral flange portion 6c which is adapted to be seated on the recessed seat 5d. The flange portion 6c' of the sealing member 6' has an outside diameter smaller than the inside diameter of the recessed seat 5d. A plurality of radial grooves 5e are formed in the surface of the recessed seat 5d so as to communicate with the threaded bore 5c. The grooves 5e extend to the inner wall surface of the recessed seat 5d. In this embodiment, the sealing member 6' is stably held in the threaded bore 5c in the weld nut 5, because the flange portion 6c' of the sealing member 6' just fits on the recessed seat 5d. In addition, when the surface of the object 2 opposite to the weld nut 5 is painted, the paint and air are allowed to escape through the valley of the thread in the threaded bore 5c and the radial grooves 5e, so that the paint does not accumulated within the threaded nut 5.

Other advantages are materially the same as those explained in connection with the first embodiment.

Figure 9:
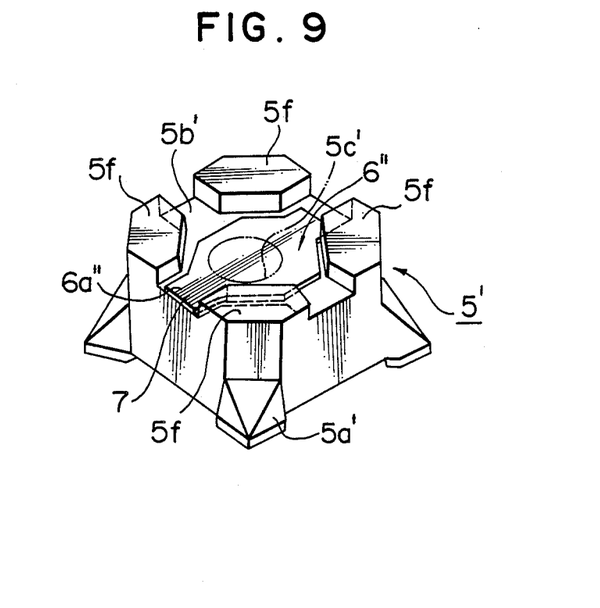
FIG. 9 is a perspective view showing a third embodiment of the present invention.
Figure 10:
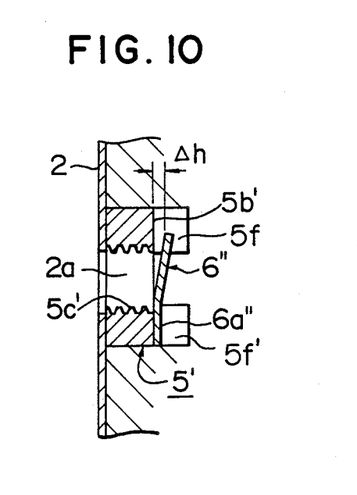
FIG. 10 is a sectional view showing the sealed weld nut shown in FIG. 9, which is welded to a body of a vehicle.
Figure 11:
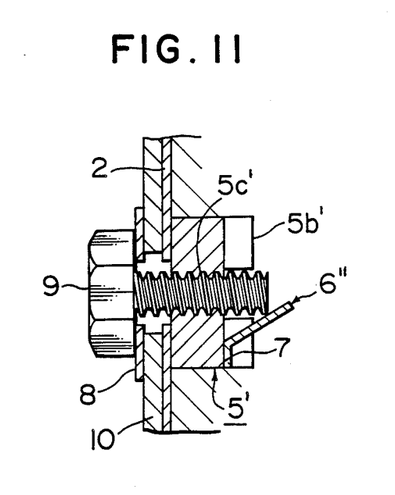
FIG. 11 is a sectional view showing a sealed weld nut shown in FIG. 10, to which a bolt is screwed.

A third embodiment of the present invention will be described with reference to FIGS. 9 to 11. In this embodiment, the sealed weld nut 5' is provided at one end thereof with weld portions 5a' formed on four corners of one end surface thereof so as to slightly project therefrom. The weld nut 5' also is provided at corners of the electrode-receiving surface 5b' thereof with electrode-receiving projections 5f. The weld nut 5' also has an axial threaded through bore 5c'. The sealing member 6" is made of a thin plate sealing member and is shaped so as to cover the entire area of the threaded hole 5c' between the four projections 5f. The sealing member 6" has a radial projection 6a" which constitutes a fixing portion. The fixing portion 6a" is fixed to a portion 7 of the electrode-receiving surface 5b' between two adjacent electrode-receiving projections 5f, 5f by spot welding. The sealing member 6" designed to be readily deflectable at an area adjacent to the fixing portion 6a". In addition, a gap h (see FIG. 10) is provided between the end of the sealing member 6" opposite to the fixing portion 6a" and the electrode-receiving surface 5b of the weld nut 5'.

The operation and effect of this embodiment are as follows. In use, the weld nut 5' is welded to the object 2 by spot welding at the weld portions 5a'. Since the gap h is provided between one end of the sealing member 6" and the surface 5b' of the weld nut 5', air and paint can escape through this gap when the surface of the object 2 opposite to the weld nut is painted. It is, therefore, possible to eliminate any stagnation of the paint and air within the weld nut 5'. In addition, when an anti-rust agent is applied towards the reverse surfaces of the object 2 carrying the weld nut 5', deposition of the anti-rust agent on the threaded surface of the threaded bore 5c ' is prevented because the sealing member 6" effectively covers the threaded bore 5c'. In addition, referring to FIG. 11, when a bolt 9 is driven into the threaded bore 5c' for the purpose of securing a member 10 to the object 2 through an intermediate washer 8, the bolt 9 can be driven without encountering substantial resistance by the sealing member 6" because the latter is easily deflectable at the portion adjacent to the fixing portion 6a" thereof. Thus, the bolt 9 can be driven through the weld nut 5' and forcibly deflect the sealing member 6", thereby securely fastening the member 10 to the object 2.

Figure 12A:
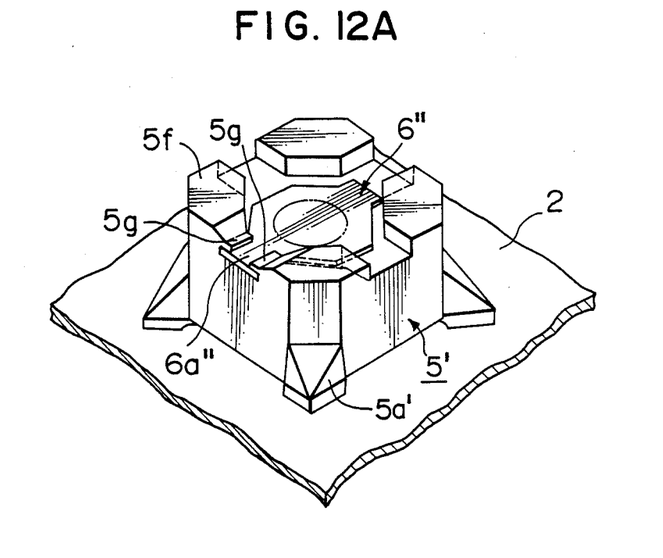
Figure 12B:
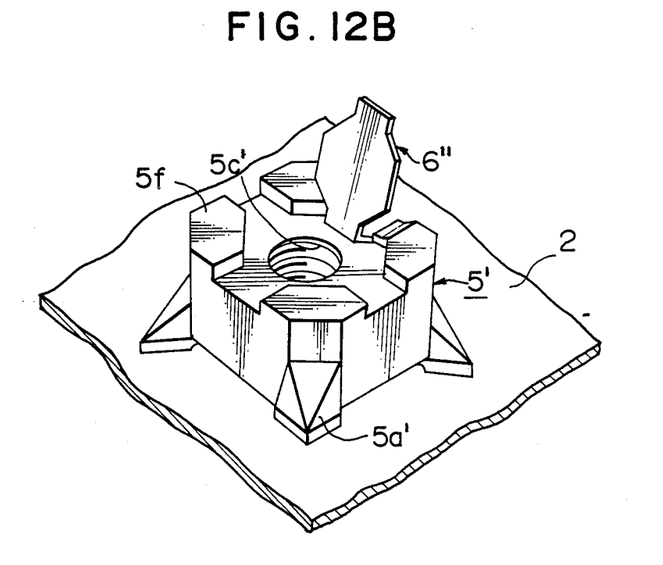

A fourth embodiment of the present invention will be described hereinunder with reference to FIGS. 12A and 12B. In this embodiment, the sealing member 6" is made of, for example, a sheet of sealing paper so as to have a fixing portion 6a" similar to that in the third embodiment. On the other hand, projections 5f are provided on their side surfaces adjacent to the fixing portion 6a" with caulking projections 5g. The caulking projections 5g are caulked onto the fixing portion 6a" of the sealing member 6". Thus, when the surface of the object 2 opposite to the weld nut 5' is painted, the paint and the air directed into the threaded bore 5c' forcibly open the sealing member 6" so as to escape from the threaded bore 5c'. As shown in FIG. 12B, the caulking projections 5g have been forcibly removed. Other portions are materially the same as those in the preceding embodiment.

Although in the described embodiment the weld nut has a substantially square cross-section, this is not exclusive and the weld nut may have other cross-sectional shapes such a hexagon. In addition, the number of the weld portions, as well as the number of the projections 5f, are not limited to 4 (four). The shapes and materials of the sealing member used in the described embodiments also are illustrative. It is to be pointed out also that the sealing member may be fixed to the weld nut by other means than the spot welding and caulking which are employed in the described embodiments. Even a slight relative movement between the weld nut and the sealing member is permissible.

Figure 13:
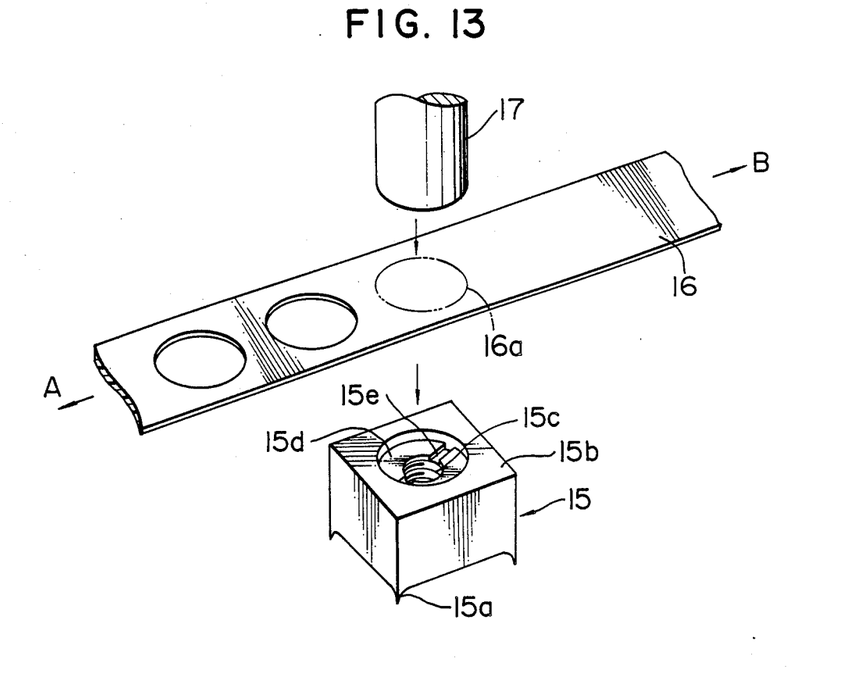
FIG. 13 is a fragmentary perspective view showing a sealed weld nut producing apparatus used for a sealed weld nut producing method according to the invention.
Figure 14:
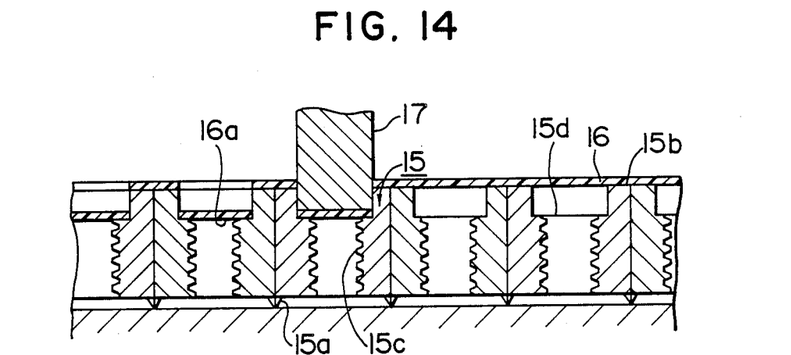
FIG. 14 is a fragmentary sectional view showing the apparatus shown in FIG. 13.
Figure 15:
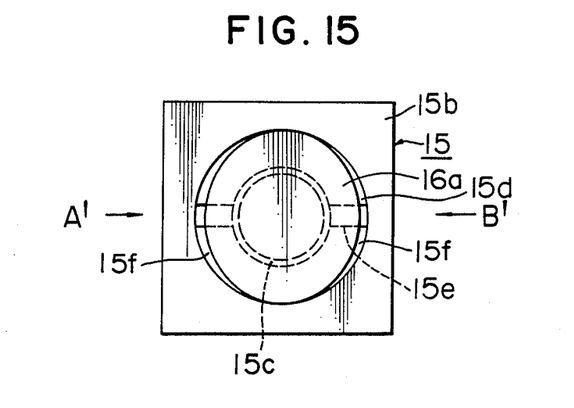
FIG. 15 is a plan view showing a sealed weld nut produced by the apparatus shown in FIG. 13.

A description will be made hereinunder as to an embodiment of the method in accordance with the invention for producing a sealed weld nut, with reference to FIGS. 13, 14 and 15.

A sealed weld nut 15 is provided with weld portions 15a projecting from four corners of one axial end surface thereof. The other axial end surface constitutes an electro-receiving surface 15b which is adapted to be contacted by a welding electrode when the nut 15 is welded to an object such as the body of an automobile. The weld nut 15 is provided with a central threaded through bore 15c which extends axially through the weld nut 15. A circular recessed seat 15d is recessed in the electrode-receiving surface 15b of the weld nut 15 concentrically with the threaded bore 15c. Thus, the recessed seat 15d has an inside diameter which is greater than the diameter of the threaded bore 15c. Radial or diametrical grooves 15e formed in the surface of the recessed seat 15d serves as passages which allow air and paint to escape therethrough. A strip or continuous sheet 16 of a sealing member 16a which may be an elastic material such as a vinyl tape is supplied by a feeding apparatus (not shown) onto the electrode-receiving surface 15b of the weld nut 15. Meanwhile, a punch 17 having an outside diameter substantially equal to the inside diameter of the recessed seat 15d is disposed above the weld nut 15 aligned with the recessed seat 15d for vertical movement. In operation, the punch 17 is lowered so that the sealing member 16a is sheared by cooperation between the punch 17 and the upper edge of the recessed seat 15d which serves as a die. The thus sheared sealing member 16a is placed in the recessed seat 15d. When the sealing member 16a is sheared, it is tensed in the directions of arrows A and B in FIG. 13 within the plane in which the sheet 16 extends. Therefore, the punched portion of the sealing member 16a contracts in the directions of arrows A' and B' immediately after the shearing, while expanding in the direction perpendicular to the direction of the arrows A and B. As a result, the sealing member 16a exhibits an oval form so that portions of the outer peripheral surface of the punched sealing member 16a on a diametrical line perpendicular to the direction of the arrows A and B contact the peripheral wall of the recessed seat 15d so as to be firmly fixed thereto.

The tension needs to be applied in the plane in which the sealing member 16a extends, namely, the direction of application of tension need not always coincide with the direction of arrows A and B, provided that it is within the plane mentioned above.

According to this embodiment, the sealing member 16a is successively punched and placed in the recessed seats 15d of the successive weld nuts 15, so that it is unnecessary to employ a separate step for shearing the sealing member 16a and the sealing member can be continuously punched and placed in the recessed seats of the successive weld nuts by a simple shearing device without necessitating special work such as caulking.

When the object such as the body of an automobile with the nut 15 welded thereto is painted at its surface opposite to the surface carrying the weld nut 15, the paint and the air are allowed to escape through the gaps 15f between the periphery of the sealing member 16a and the peripheral wall of the recessed seat 15d as a result of unidirectional contraction of the sealing member. The paint and the air then escape through the grooves 15e formed in the surface of the recessed seat 15d, so that any stagnation of the paint and the air within the weld nut 15 is prevented. When the anti-rust agent is applied to the surface of the object carrying the weld nut 15, the anti-rust agent is prevented from attaching to the threaded hole or the painted surface of the object because the threaded bore 15c is covered by the sealing member 16a.

Figure 16:
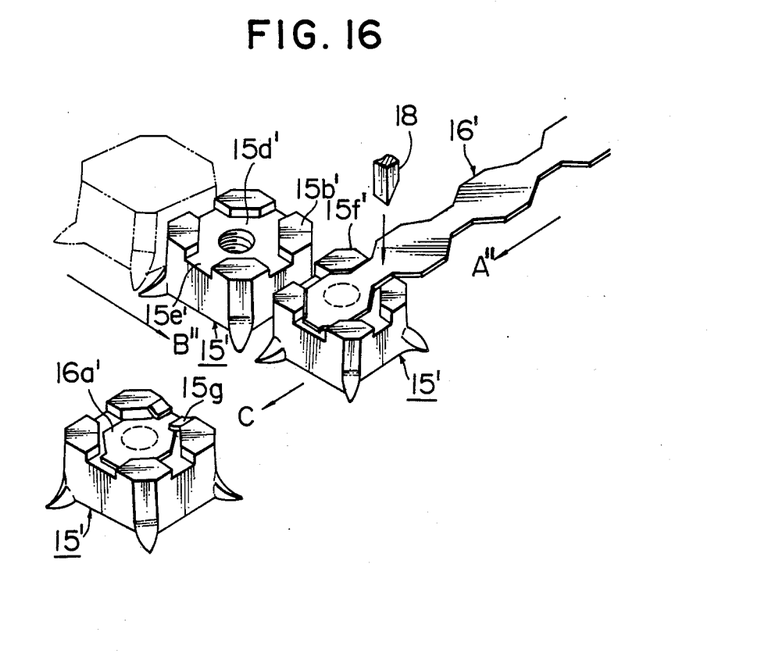
FIG. 16 is a fragmentary perspective view showing a producing apparatus used for another producing method according to the invention.

FIG. 16 shows another embodiment of the method in accordance with the present invention for producing a sealed weld nut. In this case, the sealed weld nut 15' has a substantially square recessed seat 15d' the sides of which extend orthogonally to the diagonal lines of the weld nut 15'. In addition, four grooves 15e' are formed in the electrode-receiving surface 15b' of the weld nut 15' so as to extend orthogonally to the respective sides of the weld nut 15' and so as to have the same depth as the recessed seat 15d'. The sealing member 16a' in the form of a flexible member such as a tape or a sheet of paper 16' is successively fed onto the electrode receiving surface 15b' of the weld nut 15'. Both longitudinal edges of the tape 16' have been configured beforehand in conformity with the configuration of the recessed seat 15d', so that the sealing member 16a' can fit in the recessed seat 15d' so as to be precisely located with respect to the weld nut 15'. A cutter blade 18 is disposed above the weld nut 15', for cooperation with one edge 15f of the weld nut 15' in cutting or shearing the sheet 16' into an independent sealing member 16a'. The sealing member 16a' is left in the recess 15d' and is fixed in the weld nut as a pair of opposing webs 15g above the recess 15e' adjacent to the edge 15f are caulked onto the sealing member 16a'. The weld nuts are successively fed in the direction of an arrow B" orthogonal to the direction of feed of the tape 16' indicated by an arrow A". After the sealing member 16a' is placed, the weld nut 15' is discharged in the same direction as the direction A" of feed of the tape 16", as indicated by an arrow C.

In this embodiment, the sealing member 16a' is prepared in the form of a continuous tape 16' which is consecutively supplied onto the successive weld nuts which are successively brought to the position where the sealing member is placed. The shearing of the sealing material 16a' is accomplished through cooperation between the cutting blade 18 and the adjacent edge 15f of the weld nut 15', so that it is not necessary for employing a separate step specifically for cutting the sheet 16', nor the apparatus is necessary for automatically feeding of the sheet.

Figure 17:
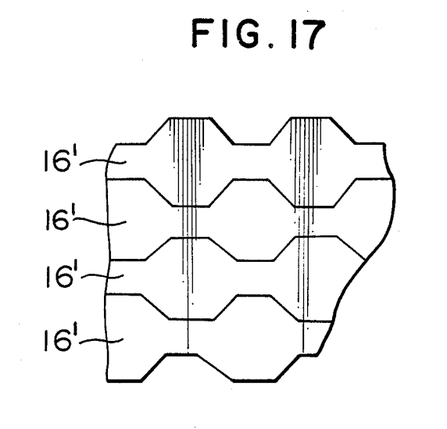
FIG. 17 is a fragmentary plan view showing a sealing member sheet to be used in the producing apparatus shown in FIG. 16.

In carrying out this embodiment, it is advisable that the continuous tapes 16' are cut out from a sheet of blank material in a staggered manner as illustrated in FIG. 17 so that whole of the sheet blank is utilized without waste.

Figure 18:
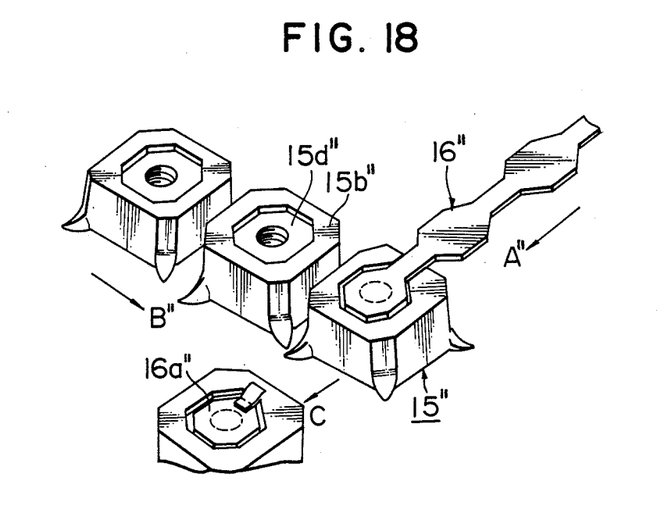
FIG. 18 is a fragmentary perspective view showing a producing apparatus used for the other producing method according to the invention.

FIG. 18 shows a different embodiment in which the recessed seat 15d" in the electrode-receiving surface 15b" of the weld nut 15" has an octagonal shape and the sealing member 16a" is fixed by a portion of one side of the octagon caulked onto the sealing member 16a" of the the tape 16".

Thus, the operation and effect are materially the same as those derived from the preceding embodiments.

Figure 19:
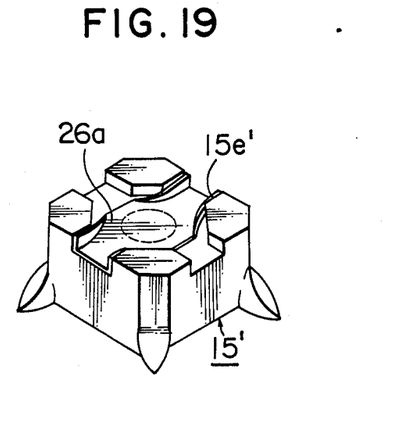
FIG. 19 is a perspective view showing a fifth embodiment of the invention.
Figure 20:
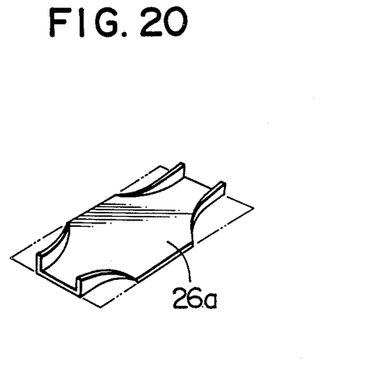
FIG. 20 is a perspective view showing a sealing member shown in FIG. 19.

FIGS. 19 and 20 show a different embodiment in which the sealing member 26a is made of a resilient material and is resiliently bent at its edges as shown in FIG. 20 such that the bent portions spring back onto the adjacent opposing surfaces of the groove 15e' so that the sealing member 26a is fixed on the recessed seat of the weld nut 15'.

Figure 21:
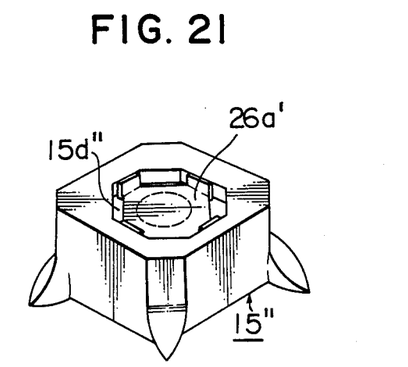
FIG. 21 is a perspective view showing a sixth embodiment of the invention.
Figure 22:
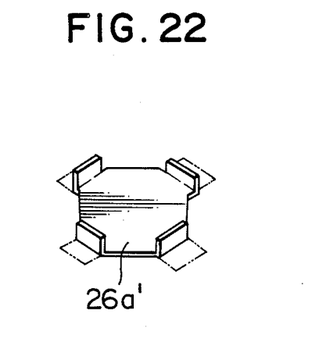
FIG. 22 is a perspective view showing a sealing member shown in FIG. 21.

In FIGS. 21 and 22, there is shown a different embodiment in which the sealing member 26a' is fixed in the recessed seat 15d"' of the weld nut 15" by being pressfit into the recessed seat 15d"' with its corners bent resiliently so as to spring back onto the adjacent wall portions of the recessed seat 15d"'.

In the embodiments explained in connection with FIGS. 18 to 22, the sealing member effectively seals the threaded bore in the weld nut and can easily come off when pushed by a bolt which is driven into the threaded bore of the weld nut.

What is claimed is:

1. A sealed weld nut comprising:
   a nut body having an axial through-bore along a center axis thereof, said nut body having first and second axial ends, and said through-bore having an inner wall surface;
   a threaded portion provided on at least a part of said inner wall surface;
   weld portions provided at the first axial end of said nut body;
   a plurality of projections provided at the second axial end of said nut body and spaced around said through-bore; and
   a separate plate-like sealing member provided at said second axial end of said nut body for preventing foreign material from passing into said through-bore at said second axial end, said plate-like member having a movable portion capable of covering and uncovering said through-bore so as to close and open said through-bore, a stationary portion, and a flexible portion connecting said movable and stationary portions, said stationary portion being fixed between projections at said second axial end.

2. A sealed weld nut according to claim 1, wherein a gap is provided between said movable portion of said sealing member and said second axial end of said nut body when said movable portion is covering said through-bore.

* * * * *